(12) United States Patent
Isonishi

(10) Patent No.: US 10,656,897 B2
(45) Date of Patent: May 19, 2020

(54) COMMUNICATION APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Kunio Isonishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/294,061

(22) Filed: Mar. 6, 2019

(65) Prior Publication Data

US 2019/0205083 A1 Jul. 4, 2019

Related U.S. Application Data

(63) Continuation of application No. 14/874,685, filed on Oct. 5, 2015, now Pat. No. 10,268,436.

(30) Foreign Application Priority Data

Oct. 20, 2014 (JP) ................ 2014-213980

(51) Int. Cl.
*G06F 3/14* (2006.01)
*H04N 21/4363* (2011.01)
(Continued)

(52) U.S. Cl.
CPC ....... *G06F 3/1454* (2013.01); *H04N 21/4367* (2013.01); *H04N 21/43637* (2013.01); *H04N 21/6437* (2013.01); *G09G 2358/00* (2013.01)

(58) Field of Classification Search
CPC ............. G06F 3/1454; H04N 21/6437; H04N 21/43637; H04N 21/4367; G09G 2358/00
See application file for complete search history.

(56) References Cited

U.S. PATENT DOCUMENTS

| 7,770,210 B2 | 8/2010 | Kubota |
| 8,272,035 B2 | 9/2012 | Kubota |

(Continued)

FOREIGN PATENT DOCUMENTS

| JP | 2003069923 | 3/2003 |
| JP | 2011118243 | 6/2011 |

(Continued)

OTHER PUBLICATIONS

Wi-Fi Certified Miracast | Wi-Fi Alliance, http://www.wi-fi.org/discover-wi-fi/wi-fi-certified-miracast.

*Primary Examiner* — Aneeta Yodichkas
(74) *Attorney, Agent, or Firm* — Venable LLP

(57) ABSTRACT

A communication apparatus displays an image on a display unit, transmits a display image displayed on the display unit to another communication apparatus by wireless communication, transmits a confirmation image for confirming a transmission destination of the display image to the another communication apparatus by wireless communication to display the confirmation image on the another communication apparatus, selects, by a user operation, whether to transmit the display image to the another communication apparatus, after transmission of the confirmation image and before transmission of the display image, and transmits the display image to the another communication apparatus if it is selected in the selecting to transmit the display image.

17 Claims, 8 Drawing Sheets

(51) Int. Cl.
*H04N 21/4367* (2011.01)
*H04N 21/6437* (2011.01)

(56) References Cited

U.S. PATENT DOCUMENTS

| | | |
|---|---|---|
| 8,806,571 B2 | 8/2014 | Kubota |
| 10,142,668 B1 * | 11/2018 | Nijim ................ H04N 21/4104 |
| 2003/0051139 A1 | 3/2003 | Kubota |
| 2008/0028217 A1 | 1/2008 | Kubota |
| 2010/0257586 A1 | 10/2010 | Kubota |
| 2011/0107388 A1 | 5/2011 | Lee et al. |
| 2011/0156879 A1 | 6/2011 | Matsushita et al. |
| 2012/0311668 A1 | 12/2012 | Kubota |
| 2013/0007895 A1 * | 1/2013 | Brolley ................ G06F 21/62 |
| | | 726/28 |
| 2014/0096164 A1 | 4/2014 | Bei et al. |
| 2014/0184474 A1 | 7/2014 | Oka |
| 2014/0325624 A1 | 10/2014 | Kubota |
| 2015/0281769 A1 * | 10/2015 | Chiu ................... H04N 5/38 |
| | | 348/564 |

FOREIGN PATENT DOCUMENTS

| | | |
|---|---|---|
| JP | 2012238268 A | 12/2012 |
| JP | 2014-127192 A | 7/2014 |

\* cited by examiner

COMMUNICATION APPARATUS, CONTROL METHOD THEREFOR, AND NON-TRANSITORY COMPUTER-READABLE STORAGE MEDIUM

CROSS-REFERENCE TO RELATED APPLICATIONS

This application is a Continuation of U.S. patent application Ser. No. 14/874,685, filed Oct. 5, 2015, which claims the benefit of Japanese Patent Application No. 2014-213980, filed Oct. 20, 2014, the entire contents of which are both hereby incorporated by reference herein.

BACKGROUND OF THE INVENTION

Field of the Invention

The present invention relates to a communication apparatus, a control method therefor, a non-transitory computer-readable storage medium and, more particularly, to a technique suitably used for screen sharing by transmitting an image to be displayed on a display to another apparatus via a network.

Description of the Related Art

In recent years, a technique of wirelessly mirroring a display screen has been proposed as Wi-Fi CERTIFIED Miracast® and the like ("Wi-Fi CERTIFIED Miracast|Wi-Fi Alliance", http://www.wi-fi.org/discover-wi-fi/wi-fi-certified-miracast). Mirroring is a technique of sharing a screen by transmitting the display screen of a transmission apparatus to a reception apparatus via a network. In "Wi-Fi CERTIFIED Miracast|Wi-Fi Alliance", Wi-Fi Direct® has been proposed as a method in which a transmission apparatus and a reception apparatus are directly connected to each other by a wireless network. In addition, Wi-Fi Protected Setup® has been proposed as a method of simplifying security setting at the time of wireless network connection. WPS includes a PIN method of making settings by a password, a PBC method of making settings by a push button, and an NFC method of making settings using NFC (Near Field Communication). As described above, with Wi-Fi CERTIFIED Miracast®, the user can directly share a screen via a wireless network by a simple operation.

Japanese Patent Laid-Open Nos. 2011-118243 and 2003-069923 propose techniques for authenticating a network connection by displaying an authentication password by a reception apparatus and inputting the password displayed on the reception apparatus from a transmission apparatus.

Conventionally, when a transmission apparatus is connected to a wireless network for screen sharing, the transmission apparatus displays a result of searching for reception apparatuses, and the user selects a reception apparatus from the search result, thereby determining the reception apparatus with which a screen is to be shared. Some reception apparatuses establish a wireless network connection to the transmission apparatus without any user operation. When the transmission apparatus shares a screen with such reception apparatus via a wireless network, the user cannot confirm in advance, on the screen of the transmission apparatus, whether an image is to be transmitted to a selected reception apparatus. Consequently, if the user erroneously selects a reception apparatus with which a screen is to be shared, a shared image may be transmitted to the reception apparatus undesirable for the user.

Japanese Patent Laid-Open Nos. 2011-118243 and 2003-069923 do not propose any method of confirming whether a screen transmission destination apparatus is correct, when a wireless network connection is established by an authentication method that uses no password.

SUMMARY OF THE INVENTION

According to one aspect of the present invention, there is provided a communication apparatus which comprises: a display unit configured to display an image, a first transmission unit configured to transmit a display image displayed on the display unit to another communication apparatus by wireless communication, a second transmission unit configured to transmit a confirmation image for confirming a transmission destination of the display image to the another communication apparatus by wireless communication to display the confirmation image on the another communication apparatus, a selection unit configured to select, by a user operation, whether to transmit the display image to the another communication apparatus, after transmission of the confirmation image and before transmission of the display image, and a control unit configured to cause the first transmission unit to transmit the display image to the another communication apparatus if the selection unit selects to transmit the display image.

Further features of the present invention will become apparent from the following description of exemplary embodiments (with reference to the attached drawings).

DESCRIPTION OF THE EMBODIMENTS

The present invention will be described in detail below based on some embodiments with reference to the accompanying drawings. Note that arrangements to be described in the following embodiments are merely examples, and the present invention is not limited to the illustrated arrangements.

First Embodiment

In this embodiment, a method of confirming transmission of a shared screen by sharing a transmission confirmation image by a transmission apparatus and a reception apparatus will be explained.

Figure 1:
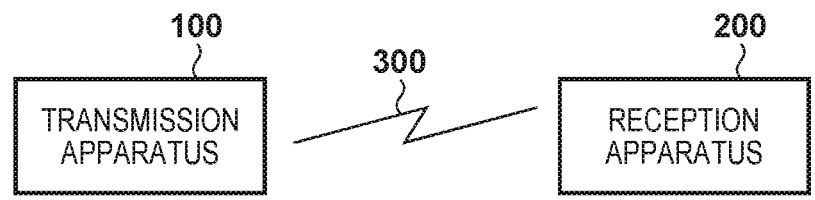
FIG. 1 is a view showing a connection form between a transmission apparatus 100 and a reception apparatus 200 according to the first and second embodiments.

FIG. 1 is a view showing a connection form between a transmission apparatus 100 and a reception apparatus 200 according to the first embodiment. The transmission apparatus 100 and the reception apparatus 200 are wirelessly connected to each other via a wireless network 300. The transmission apparatus 100 starts, pauses, or ends transmission of image data in accordance with an image distribution request transmitted from the reception apparatus 200 via the wireless network 300. The transmission apparatus 100 complies with the Wi-Fi CERTIFIED Miracast® standard with respect to an operation which is not specifically described in this embodiment. Practical examples of the transmission apparatus 100 are a camera, video camera, smartphone, mobile phone, and PC. However, the present invention is not limited to them, and any apparatus having a hardware arrangement and module arrangement (to be described later) may be used.

On the other hand, the reception apparatus 200 receives image data transmitted from the transmission apparatus 100 via the wireless network 300, and displays the received image data. The reception apparatus 200 complies with the Wi-Fi CERTIFIED Miracast® standard with respect to an operation which is not specifically described in this embodiment. Practical examples of the reception apparatus 200 are a smartphone, mobile phone, PC, television set, and projector. However, the present invention is not limited to them, and any apparatus having a hardware arrangement and module arrangement (to be described later) may be used. The wireless network 300 is, for example, a wireless LAN as a home network but is not limited to this.

Figure 2:
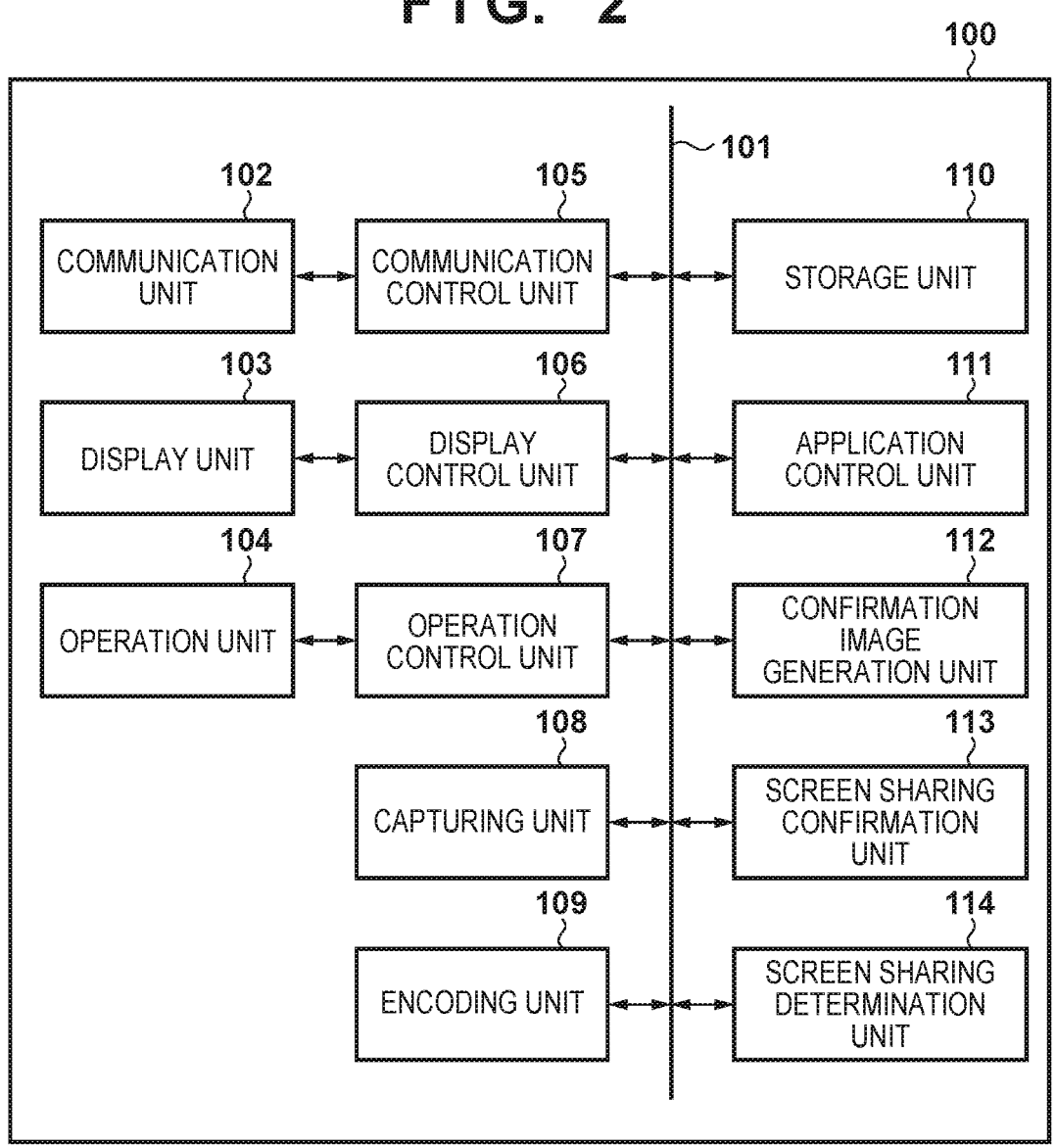
FIG. 2 is a block diagram showing an example of the internal arrangement of the transmission apparatus 100 according to the first embodiment.

FIG. 2 is a block diagram showing an example of the internal arrangement of the transmission apparatus 100 according to the first embodiment. A bus 101 serves as a transfer path for various kinds of data. For example, digital data captured by a capturing unit 108 is sent to a predetermined processing unit via the bus 101. A communication unit 102 transmits/receives image data and control information to/from the reception apparatus 200. Since the information amount of image data is generally large, when the communication unit 102 transmits/receives image data via the network, it uses data compression-coded by an encoding unit 109.

In this embodiment, assume that RTP (Real-time Transport Protocol) is used as a data transfer protocol, and RTSP (Real Time Streaming Protocol) is used as a playback control protocol. RTP is a protocol for transmitting/receiving multimedia data such as a moving image and sound via the network in real time, which has been standardized as RFC 3550 by IETF® (the Internet Engineering Task Force). UDP, HTTP, HTTPS, or TCP can be used as a transport protocol in the lower layer of RTP. RTSP is a protocol for controlling streaming, which has been standardized as RFC 2326, and TCP is used as a transport protocol in the lower layer of RTSP. Since the encoding unit 109 according to this embodiment uses MPEG-2 TS as a multiplexing method, the communication unit 102 packetizes image data according to RFC 2250 that defines the RTP payload format of MPEG-2 TS data. Note that packetizing processing by the encoding unit 109 is not limited to this.

A display unit 103 displays a video. For example, a liquid crystal display is used as the display unit 103. An operation unit 104 accepts an input (operation information) from the user. For example, a mouse and keyboard, or a touch screen is used as the operation unit 104. A communication control unit 105 controls communication of image data and control information to be transmitted to the reception apparatus. The communication control unit 105 may have a function of receiving remote operation information transmitted from the reception apparatus 200 via the wireless network 300. In this case, a user instruction input by the reception apparatus 200 can be processed as an input of the operation unit 104.

A display control unit 106 controls display of images and characters displayed on the display unit 103. An operation control unit 107 controls operation information input from the operation unit 104. The capturing unit 108 captures an image displayed on the display unit 103 and generates image data. The captured image includes, for example, OSD information such as operation buttons to be superimposed and displayed on the image. The encoding unit 109 performs processing of compression-coding image data by an MPEG-4 AVC/H.264 method, and multiplexing the image data by an MPEG-2 TS method. MPEG-2 TS indicates a container format for multiplexing and transmitting media data such as an encoded image or sound, and is used as a multiplexing method according to this embodiment.

A storage unit 110 is formed by a ROM and RAM which save programs and control data to be used by the transmission apparatus 100 to operate. An application control unit 111 controls an application program which is saved in the storage unit 110 and operates on the transmission apparatus 100. A confirmation image generation unit 112 generates a screen sharing confirmation screen for confirming whether to share a screen displayed on the transmission apparatus 100 with another apparatus (whether to share a screen). A screen sharing confirmation unit 113 determines whether to perform screen sharing confirmation for prompting the user to select whether to share a screen. A screen sharing determination unit 114 determines whether to share a screen.

Figure 3:
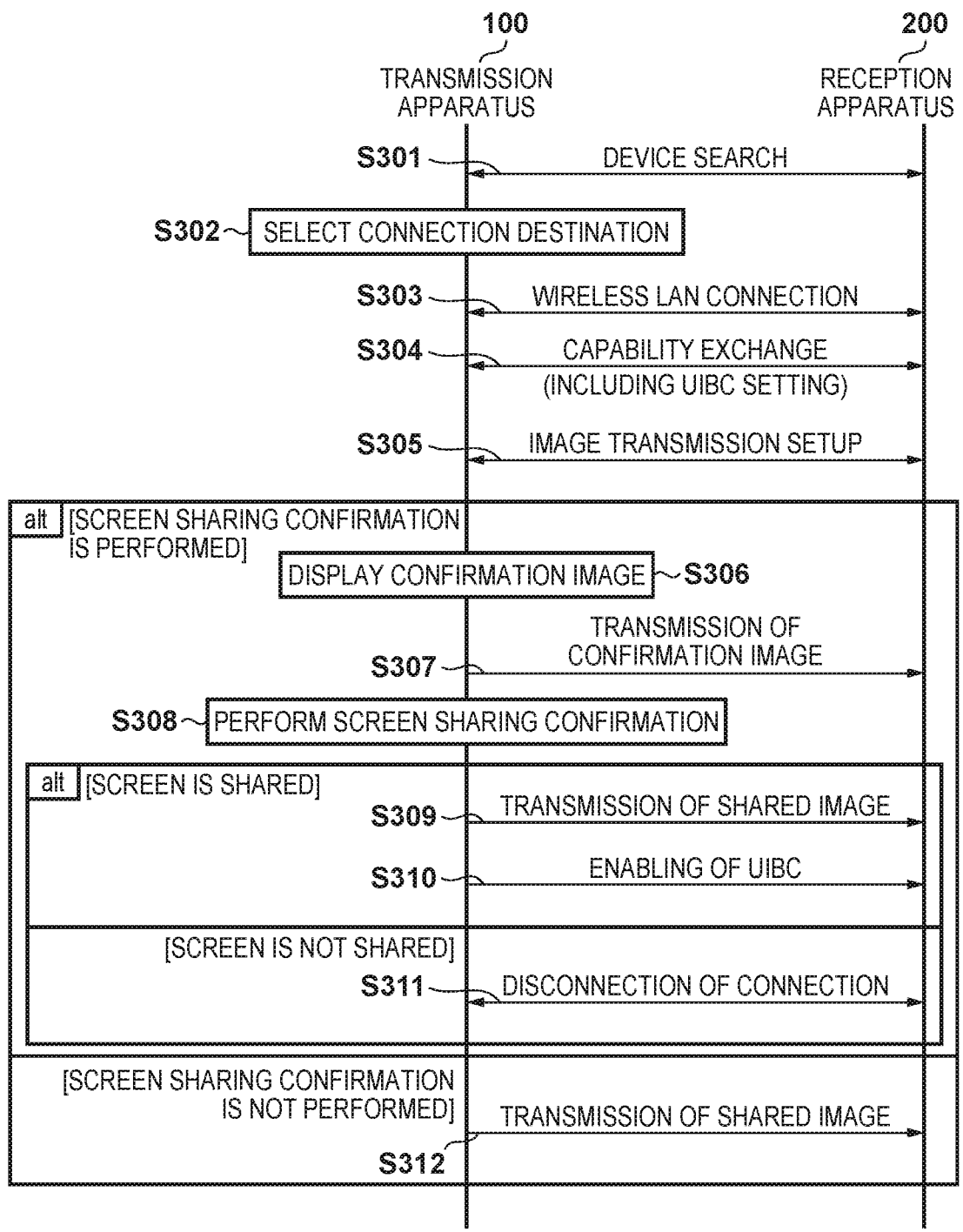
FIG. 3 is a sequence chart showing an example of the sequence of screen sharing processing according to the first embodiment.

Next, image transmission/reception control by the transmission apparatus 100 and the reception apparatus 200 according to this embodiment will be described with reference to FIG. 3. FIG. 3 is a sequence chart showing an example of a sequence from when the transmission apparatus 100 and the reception apparatus 200 start connection until the transmission apparatus 100 transmits an image according to the first embodiment. FIG. 3 shows steps in time series from top to bottom.

In step S301, the communication control unit 105 of the transmission apparatus 100 starts to search for a connection destination apparatus. As a search method, for example, the transmission apparatus 100 executes Device Discovery as a process defined by Wi-Fi Direct®. In Device Discovery, a plurality of apparatuses search for each other by wireless frame transmission/reception using a Probe Request frame and Probe Response frame as wireless LAN management frames. When a predetermined time elapses or when the user performs a device search end operation, the process advances to step S302.

In step S302, the display unit 103 of the transmission apparatus 100 displays a reception apparatus list generated by the display control unit 106. The reception apparatus list is a list of pieces of information which have been received by the transmission apparatus 100 from reception apparatuses in step S301 and are capable of uniquely identifying the reception apparatuses. As the information, information about a P2P Information Element (to be referred to as P2P IE hereinafter) included in a Beacon frame or Probe Response frame received from the reception apparatus 200 is used. Information about P2P Device Address or Device Name included in the P2P Device Info attribute of the P2P IE is also capable of uniquely identifying the reception apparatus.

Figure 4:
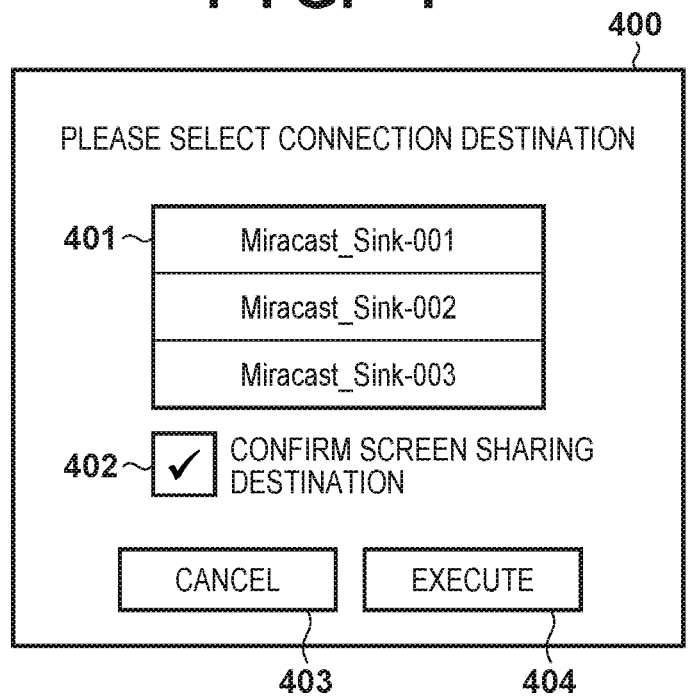
FIG. 4 is a view showing an example of a connection destination selection screen according to the first embodiment.

FIG. 4 shows an example of a connection destination selection screen 400 which is displayed by the display unit 103 of the transmission apparatus 100 in step S302. In the connection destination selection screen 400, a reception apparatus list 401 is displayed. In the reception apparatus list 401, assume that the reception apparatus 200 is indicated by Miracast_Sink-001 acquired from Device Name. When an arbitrary reception apparatus is selected by a user operation from the reception apparatus list 401, and an "execute" button 404 is pressed, the connection destination selection screen 400 is closed and the process advances to step S303.

Note that the display unit 103 of the transmission apparatus 100 may display a selection screen for selecting whether to confirm a screen sharing destination. FIG. 4 shows a screen sharing destination confirmation selection 402 as an example of the selection screen for selecting whether to confirm a screen sharing destination. The screen sharing destination confirmation selection 402 is a check box. When the screen sharing destination confirmation selection 402 is checked by a user operation, and the "execute" button 404 is pressed, the transmission apparatus performs screen sharing confirmation to be described later with reference to FIG. 5. Note that if the user wants to cancel selection of the reception apparatus in the reception apparatus list 401 and the check state of the screen sharing destination confirmation selection 402, he/she presses a "cancel" button 403.

In this embodiment, if the reception apparatus 200 is selected by a user operation in step S302, the communication control unit 105 of the transmission apparatus 100 starts, in step S303, wireless network connection to the reception apparatus 200. At this time, the transmission apparatus 100 uses Wi-Fi Protected Setup® (to be referred to as WPS hereinafter) as a wireless network security setting method. As the security setting method by WPS, there are provided the PIN method by a password, the PBC method by a push button, and the NFC method using NFC (Near Field Communication). Upon completion of the wireless network connection, the process advances to step S304.

In step S304, the communication control unit 105 of the transmission apparatus 100 exchanges capability information with the reception apparatus 200. The capability information is information of images which can be processed by the transmission apparatus 100 or reception apparatus 200, UIBC (User Input Back Channel) device information, or the like. The UIBC device information is information used by the reception apparatus 200 to remotely operate the transmission apparatus 100. The UIBC device information includes information indicating whether a remote operation is enabled and information of an operation device type for performing a remote operation. The operation device type indicates, for example, a mouse and keyboard. The capability information is exchanged by exchanging RTSP messages in Wi-Fi CERTIFIED Miracast® (to be referred to as Miracast hereinafter). More specifically, the transmission apparatus 100 and the reception apparatus 200 exchange the capability information by M1 (OPTION), M2 (OPTION), M3 (GET_PARAMETER), and M4 (SET_PARAMETER) which are defined by Miracast.

When exchanging the capability information, the screen sharing confirmation unit 113 of the transmission apparatus 100 may determine whether to transmit a screen sharing confirmation image to the reception apparatus 200 (perform screen sharing confirmation determination). A screen sharing confirmation determination method will be described later with reference to FIG. 5. In the screen sharing confirmation determination processing, if a transmission destination apparatus is confirmed, the transmission apparatus 100 may disable reception of the UIBC device information by an RTSP M4 request message. More specifically, the transmission apparatus 100 sets "disable" in a wfd-uibc-setting parameter in an RTSP M4 request. The transmission apparatus 100 can prevent screen sharing selection, to be performed in a subsequent step, from being operated from the reception apparatus 200 by disabling reception of the UIBC device information. Upon end of exchange of the capability information, the process advances to step S305.

In step S305, the communication control unit 105 of the transmission apparatus 100 performs an image transmission setup with the reception apparatus 200. The image transmission setup is performed by, for example, exchanging RTSP messages in Miracast. More specifically, this message exchange processing includes Trigger SETUP by M5 (SET_PARAMTER), Trigger PLAY by M6 (SETUP) and M5 (SET_PARAMETER), and message exchange by M7 (PLAY) which are defined by Miracast. The communication control unit 105 of the transmission apparatus 100 branches the subsequent processing in accordance with the result of the screen sharing confirmation determination processing by the screen sharing confirmation unit 113 in step S304. That is, if the screen sharing confirmation unit 113 performs screen sharing confirmation, the process advances to step S306; otherwise, the process advances to step S312.

Figure 6:
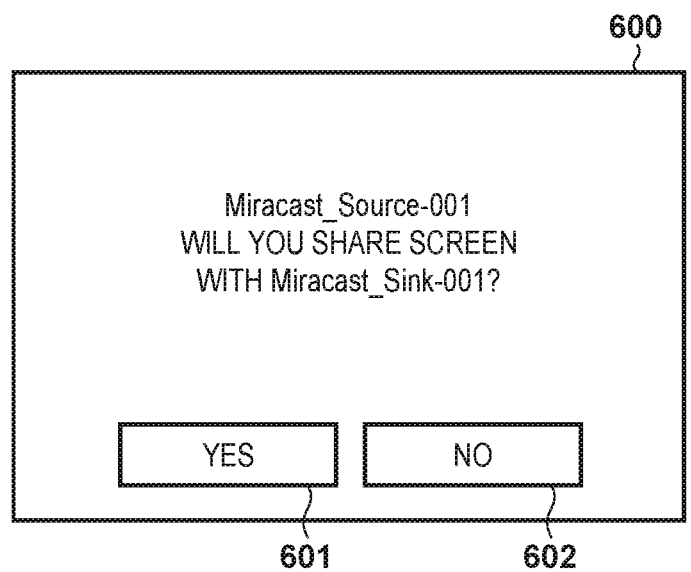
FIG. 6 is a view showing an example of a screen sharing confirmation screen according to the first embodiment.
Figure 8:
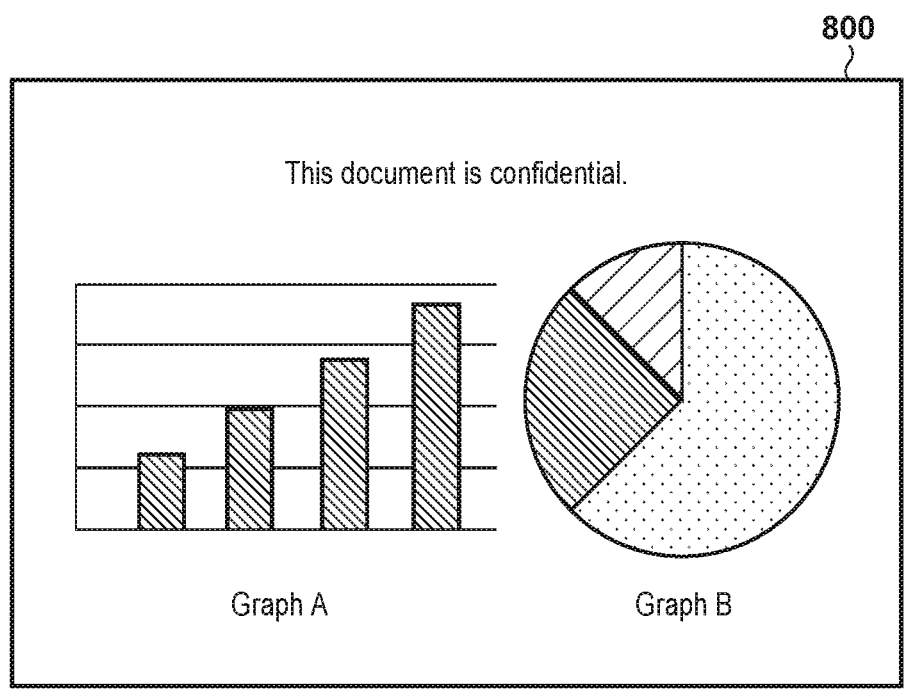
FIG. 8 is a view showing an example of a shared screen according to the first embodiment.

In step S306, the display unit 103 of the transmission apparatus 100 displays the screen sharing confirmation image. The screen sharing confirmation image is generated by the confirmation image generation unit 112, and displayed on the display unit 103 via the display control unit 106. The screen sharing confirmation image is assumed to be an image which can be uniquely identified by the transmission apparatus 100, as shown in FIG. 6 (to be described later). The display unit 103 may display the screen sharing confirmation image on the full screen using the entire display region. When the display unit 103 displays the screen sharing confirmation image using the full screen, it is possible to prevent the display unit 103 from displaying the shared screen the user wants to share. Assume that the shared screen indicates a screen displayed by an application operated by the application control unit 111 of the transmission apparatus 100, as shown in FIG. 8 (to be described later). After the display unit 103 displays the screen sharing confirmation image, the process advances to step S307.

In step S307, the communication control unit 105 of the transmission apparatus 100 transmits the screen sharing confirmation image to the reception apparatus 200. Real-time Transport Protocol (to be referred to as RTP hereinafter) is used to transmit the image. The transmission image is generated by capturing an image displayed on the transmission apparatus 100. More specifically, the capturing unit 108 of the transmission apparatus 100 captures an image displayed on the display unit 103. Subsequently, the encoding unit 109 of the transmission apparatus 100 encodes the image captured by the capturing unit 108, thereby generating a transmission image receivable by the reception apparatus 200. After the start of transmission of the screen sharing confirmation image, the process advances to step S308.

In step S308, the screen sharing determination unit 114 of the transmission apparatus 100 determines whether to share a screen. The determination method by the screen sharing determination unit 114 will be described later with reference to FIG. 7. If it is determined to share the screen, the process advances to step S309; otherwise, the process advances to step S311.

In step S309, the communication control unit 105 of the transmission apparatus 100 transmits a shared image for sharing the screen to the reception apparatus 200. Transmission and generation of an image are implemented by capturing a display image by the encoding unit 109 of the transmission apparatus 100 using RTP, similarly to step S307. The display unit 103 of the transmission apparatus 100 displays the shared image. The shared image is, for example, an image generated by the application control unit 111. FIG. 8 is a view showing an example of the shared image. Since the screen displayed on the display unit 103 of the transmission apparatus 100 is a shared screen, the transmission image generated by the capturing unit 108 serves as a shared image. Note that the shared image may be an image occupying part of a range displayable on the display unit 103. After the start of transmission of the shared image, the process advances to step S310.

In step S310, the communication control unit 105 of the transmission apparatus 100 enables the UIBC device information with respect to the reception apparatus 200. More specifically, the communication control unit 105 sets "enable" in the wfd-uibc-setting parameter in the RTSP M4 request. The communication control unit 105 permits a remote operation from the reception apparatus 200 by enabling the UIBC device information.

If it is determined in step S308 not to share the screen, the communication control unit 105 of the transmission apparatus 100 disconnects, in step S311, the wireless network connection from the reception apparatus 200, thereby terminating the sequence. If it is determined in step S304 not to perform screen sharing confirmation, the communication control unit 105 of the transmission apparatus 100 transmits the shared image to the reception apparatus 200 in step S312. A method of generating and transmitting the shared image is the same as that in step S309 and a description thereof will be omitted.

Figure 5:
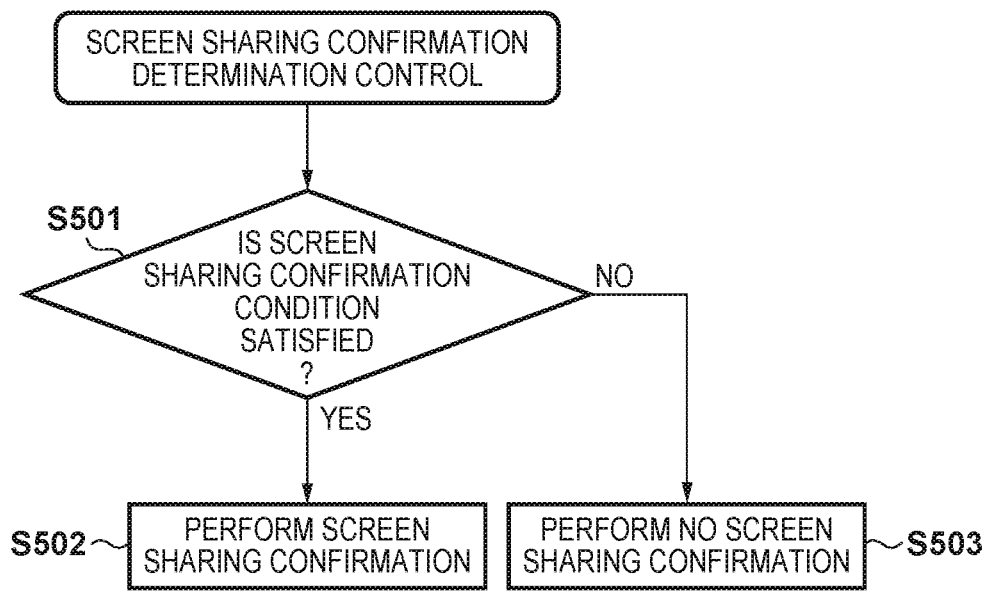
FIG. 5 is a flowchart illustrating an example of screen sharing confirmation determination control according to the first embodiment.

FIG. 5 is a flowchart illustrating an example of screen sharing confirmation determination control of the transmission apparatus 100 in step S304. Screen sharing confirmation determination control is performed by the screen sharing confirmation unit 113 shown in FIG. 2 to determine whether to perform screen sharing confirmation. In step S501, the screen sharing confirmation unit 113 of the transmission apparatus 100 determines whether a screen sharing confirmation condition is satisfied. If the screen sharing confirmation condition is satisfied, the screen sharing confirmation unit 113 determines to perform screen sharing confirmation (step S502); otherwise, the screen sharing confirmation unit 113 determines not to perform screen sharing confirmation (step S503). The screen sharing confirmation condition is, for example, one or a combination of the following four conditions.

The first condition is that the screen sharing destination confirmation selection 402 of the connection destination selection screen 400 shown in FIG. 4 has been checked ("confirm screen sharing destination" has been selected). The second condition is that the WPS security setting method used by the communication unit 102 of the transmission apparatus 100 to establish the wireless network connection is a specific method. More specifically, the security setting method is the PBS method using a push button. If the security setting method is the PIN method of displaying a password on the reception apparatus or the NFC method of specifying a connection destination by a touch operation, the screen sharing confirmation unit 113 determines not to perform screen sharing confirmation. The third condition is that the image data type displayed by the application control unit 111 of the transmission apparatus 100 is a confidential data type. The fourth condition is that the image data type displayed by the application control unit 111 of the transmission apparatus 100 is a copyrighted data type.

Figure 7:
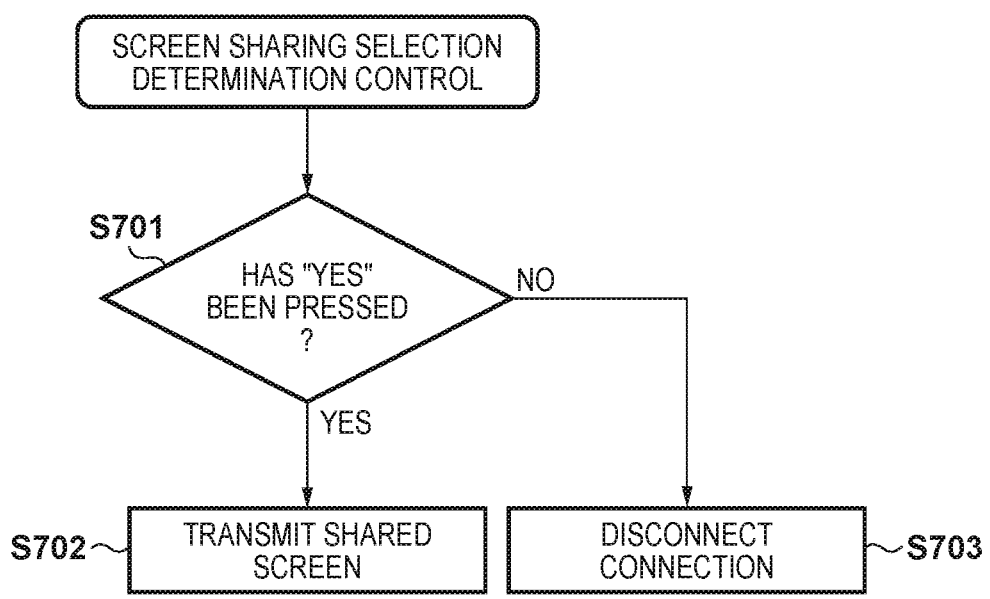
FIG. 7 is a flowchart illustrating an example of screen sharing selection determination control according to the first embodiment.

FIG. 7 is a flowchart illustrating an example of screen sharing determination control of the transmission apparatus 100 in step S308. Screen sharing determination control is performed by the screen sharing determination unit 114 shown in FIG. 2. FIG. 6 shows an example of the screen sharing confirmation screen. The operation control unit 107 of the transmission apparatus 100 detects button pressing by the user in the screen sharing confirmation screen displayed on the display unit 103, and the screen sharing determination unit 114 determines based on the detection operation whether to share the screen. The user visually perceives the screen sharing image displayed on the reception apparatus 200, determines whether to permit screen sharing, and presses a button.

In step S701, the operation control unit 107 determines whether a "YES" button 601 has been pressed in the screen sharing confirmation screen. If the "YES" button 601 has been pressed, the screen sharing determination unit 114 determines to share the screen (step S702). If a "NO" button 602 has been pressed, the screen sharing determination unit 114 determines not to share the screen, and performs processing of disconnecting the wireless network connection (step S703). Note that if the communication control unit 105 of the transmission apparatus 100 can detect a user instruction input by the reception apparatus 200, the screen sharing determination unit 114 may determine based on the detection operation whether to share the screen.

As described above, according to this embodiment, prior to screen sharing, the transmission apparatus transmits the screen sharing confirmation image for allowing the user to visually perceive an image transmission destination. The user visually perceives the screen sharing confirmation image displayed on the reception apparatus with which the screen is to be shared, and determines whether to permit screen sharing. This can reduce the possibility that the shared image is transmitted to a reception apparatus undesirable for the user.

Second Embodiment

In this embodiment, a method of confirming transmission of a shared screen by transmitting a transmission confirmation image generated in advance by a transmission apparatus will be described. A description of the same points as in the first embodiment will be omitted.

Figure 9:
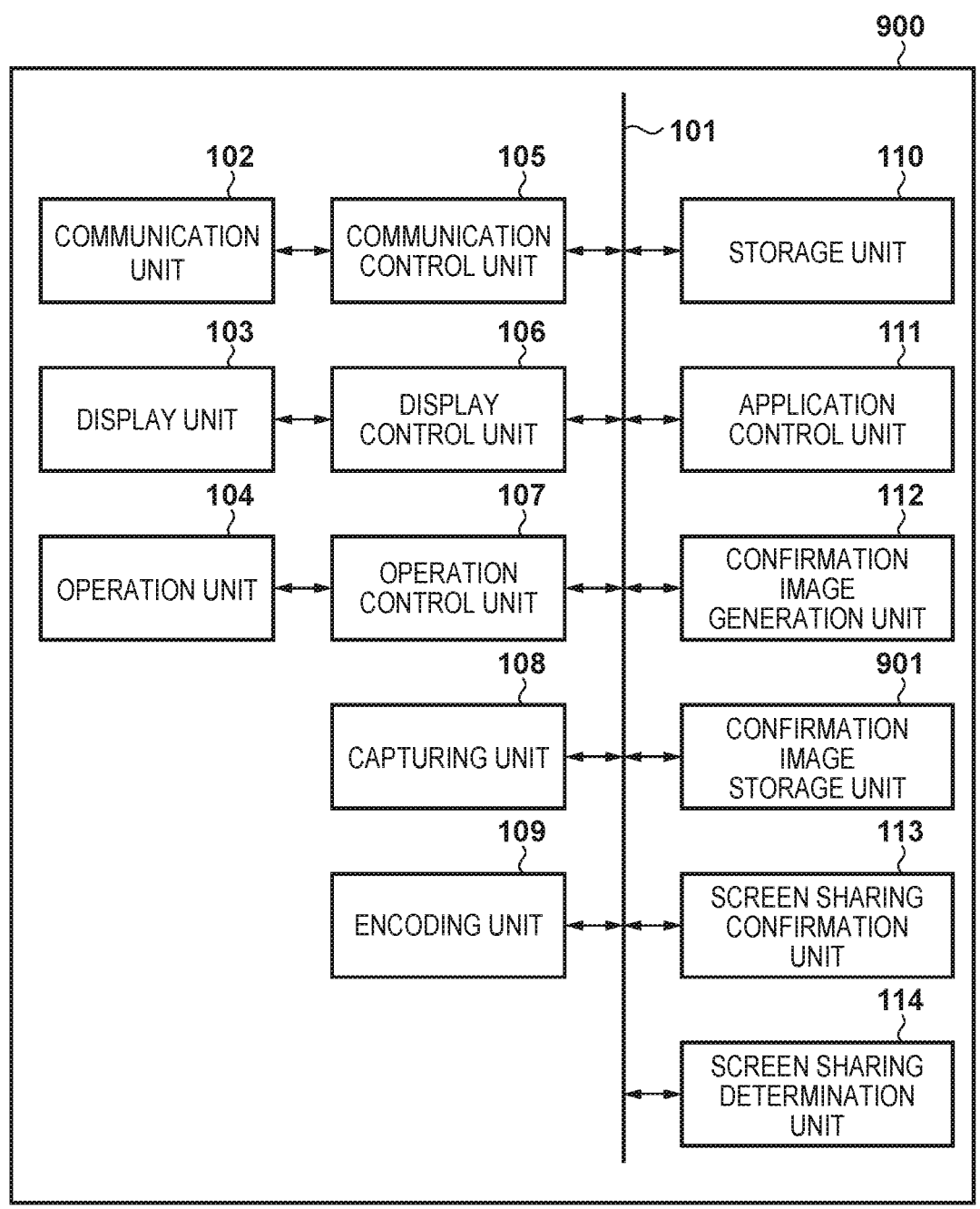
FIG. 9 is a block diagram showing an example of the internal arrangement of a transmission apparatus 900 according to the second embodiment.

FIG. 1 is the same as in the first embodiment and a description thereof will be omitted. FIG. 9 is a block diagram showing an example of the internal arrangement of a transmission apparatus 900 according to the second embodiment. As shown in FIG. 9, the transmission apparatus 900 according to this embodiment includes a confirmation image storage unit 901. In FIG. 9, the same reference numerals as those in FIG. 2 denote the same parts and a description thereof will be omitted.

The confirmation image storage unit 901 holds a screen sharing confirmation transmission image to be transmitted to a reception apparatus 200. A screen sharing confirmation image is image data compression-coded by the MPEG-4 AVC/H.264 method, and multiplexed by the MPEG-2 TS method. Assume that the screen sharing confirmation image is an image which can be uniquely identified by the transmission apparatus 900, like a screen sharing confirmation transmission image 1100 shown in FIG. 11 (to be described later). With respect to generation of the screen sharing confirmation image, the transmission apparatus 900 may hold in advance a generated image in a ROM, or hold, in a RAM, an image dynamically generated by an encoding unit 109 upon, for example, activation of the system of the transmission apparatus 900 or start of a sequence shown in FIG. 10. Since a screen sharing confirmation image format needs to be displayable on all reception apparatuses, it is desirable to use an image format defined by Miracast as a format which must be supported.

Figure 10:
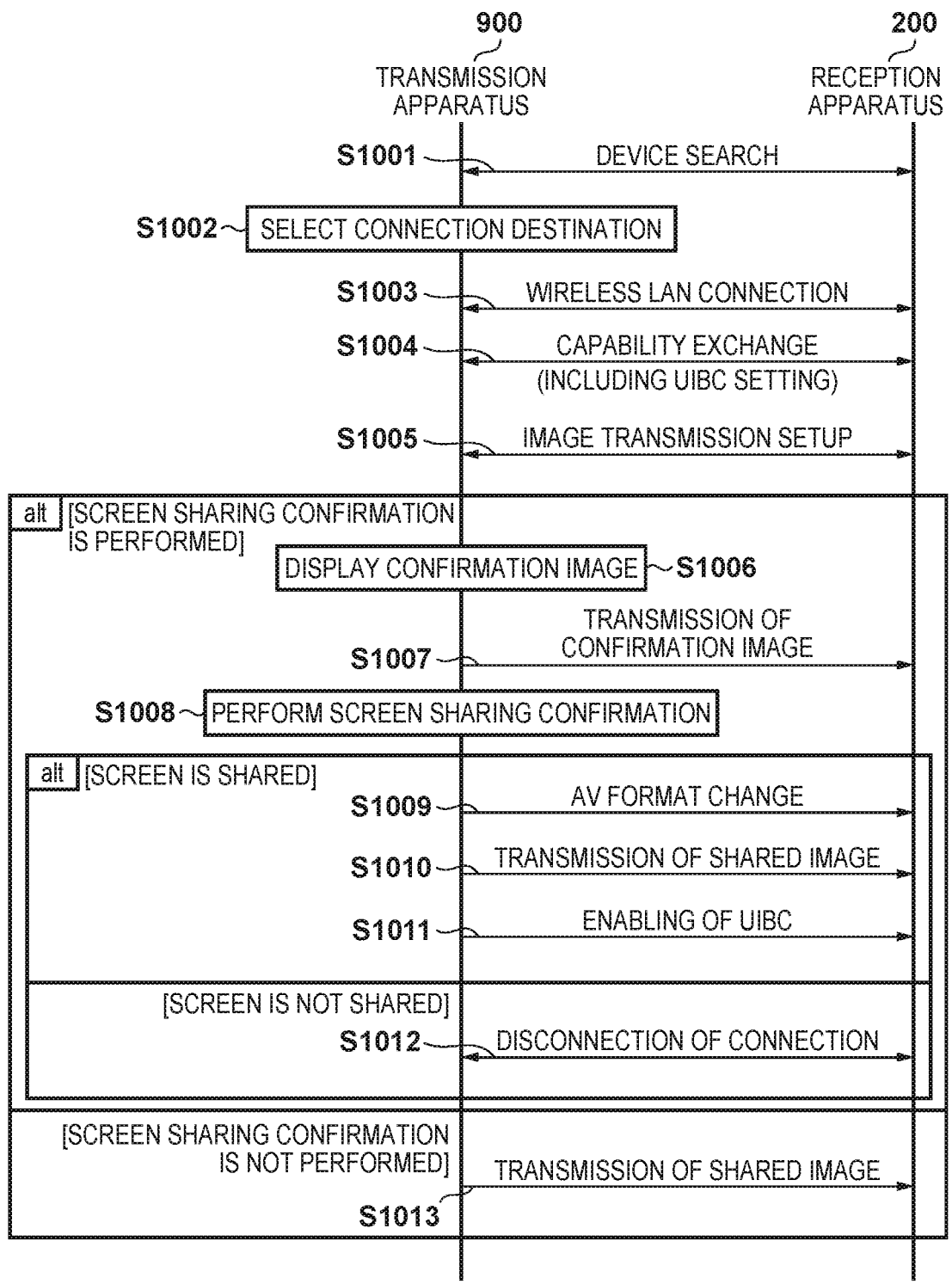
FIG. 10 is a sequence chart showing an example of the sequence of screen sharing processing according to the second embodiment.

Image transmission/reception control by the transmission apparatus 900 and the reception apparatus 200 according to this embodiment will be described with reference to FIG. 10. FIG. 10 is a sequence chart showing an example of a sequence from when the transmission apparatus 900 and the reception apparatus 200 start connection until the transmission apparatus 900 transmits an image according to the second embodiment. FIG. 10 shows steps in time series from top to bottom.

In step S1001, a communication control unit 105 of the transmission apparatus 900 starts to search for a connection destination apparatus. The processing in this step is the same as in step S301 of FIG. 3 and a description thereof will be omitted. When a predetermined time elapses or when the user performs a device search end operation, the process advances to step S1002. In step S1002, a display unit 103 of the transmission apparatus 900 displays a reception apparatus list generated by a display control unit 106. The processing in this step is the same as in step S302 of FIG. 3 and a description thereof will be omitted. When a reception apparatus is selected by a user operation from a reception apparatus list 401, a connection destination selection screen 400 is closed and the process advances to step S1003.

In step S1003, the communication control unit 105 of the transmission apparatus 900 starts wireless network connection to the reception apparatus 200. The processing in this step is the same as in step S303 of FIG. 3 and a description thereof will be omitted. Upon completion of the wireless network connection, the process advances to step S1004. In step S1004, the communication control unit 105 of the transmission apparatus 900 exchanges capability information with the reception apparatus 200. In this step, a capability information exchange method is the same as that in step S304 of FIG. 3. The difference is that the image resolution of the sharing confirmation image which is held in the confirmation image storage unit 901 and is to be transmitted in step S1007, refresh rate information, and the like are used as transmission image information transmitted by a wfd-video-formats parameter of M4 (SET_PARAMETER). Upon end of exchange of the capability information, the process advances to step S1005.

In step S1005, the communication control unit 105 of the transmission apparatus 900 performs an image transmission setup with the reception apparatus 200. The processing in this step is the same as in step S305 of FIG. 3 and a description thereof will be omitted. If screen sharing confirmation is performed, the process advances to step S1006; otherwise, the process advances to step S1013. In step S1006, the display unit 103 of the transmission apparatus 900 displays the screen sharing confirmation image. The screen sharing confirmation image is generated by a confirmation image generation unit 112 of the transmission apparatus 900, and displayed on the display unit 103 via the display control unit 106. Note that the screen sharing confirmation image is assumed to be an image which can be uniquely identified by the transmission apparatus 900, as shown in FIG. 6 (to be described alter), similarly to the first embodiment.

Figure 12:
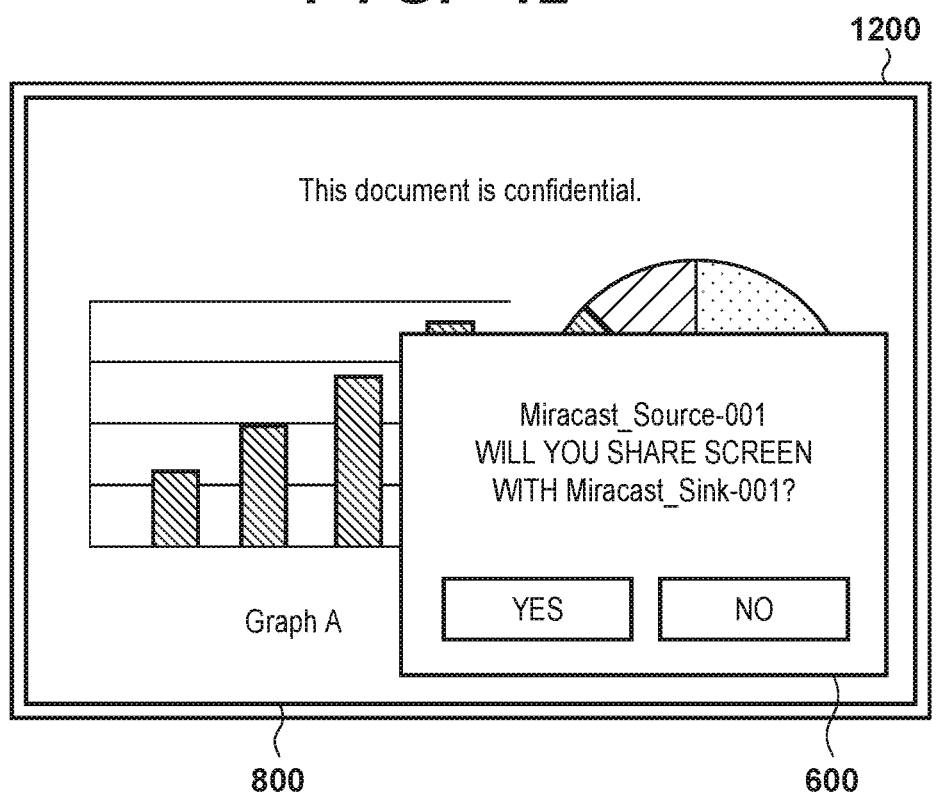
FIG. 12 is a view showing an example of screen sharing confirmation screen display according to the second embodiment.

FIG. 12 shows an example of display of a screen sharing confirmation screen on the display unit 103. In a screen sharing confirmation screen display 1200 shown in FIG. 12, a screen sharing confirmation image 600 is displayed in a lower right region so as to readily, visually perceive a shared image 800. This enables the user to confirm a screen to be shared and a screen sharing confirmation screen at the same time. After the display unit 103 displays the screen sharing confirmation image, the process advances to step S1007.

Figure 11:
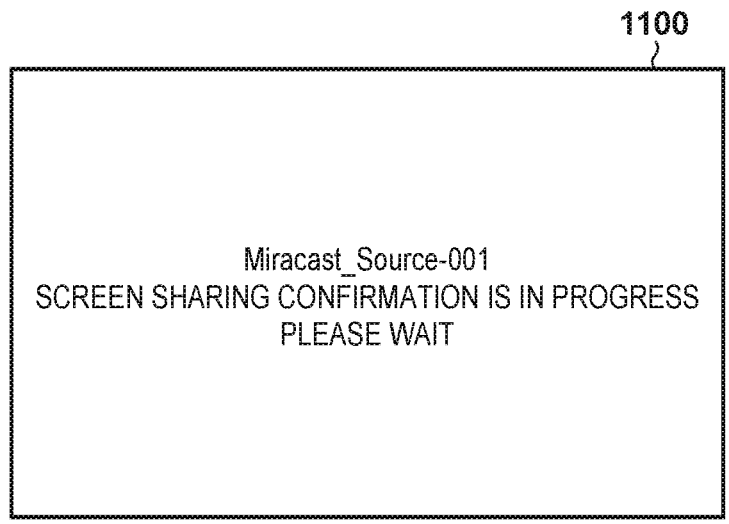
FIG. 11 is a view showing an example of a screen sharing confirmation transmission image according to the second embodiment.

In step S1007, the communication control unit 105 of the transmission apparatus 900 transmits the transmission confirmation image saved in the confirmation image storage unit 901 to the reception apparatus 200. FIG. 11 shows an example of a screen sharing confirmation transmission image 1100. As shown in FIG. 11, assume that the transmission confirmation image 1100 is an image which can be uniquely identified by the transmission apparatus 900. RTP is used to transmit the image, similarly to step S307 of FIG. 3. After the transmission apparatus 900 starts transmission of the transmission confirmation image 1100, the process advances to step S1008.

In step S1008, a screen sharing determination unit 114 of the transmission apparatus 900 determines whether to share a screen. The processing in this step is the same as in step S308 of FIG. 3 and a description thereof will be omitted. If it is determined to share the screen, the process advances to step S1009; otherwise, the process advances to step S1012.

In step S1009, the communication control unit 105 of the transmission apparatus 900 notifies the reception apparatus 200 of a change in AV format to switch the transmission image. A notification of the change in AV format is sent by an RTSP M4 (SET_PARAMETER) message. More specifically, a notification of image information such as a refresh rate and the resolution of the shared image to be transmitted in step S1010 is sent using the wfd-video-formats parameter in the RTSP M4 request. Upon end of notification of the AV format, the process advances to step S1010.

In step S1010, the communication control unit 105 of the transmission apparatus 900 transmits the shared image for sharing the screen to the reception apparatus 200. The processing in this step is the same as in step S309 of FIG. 3 and a description thereof will be omitted. After the start of transmission of the shared image, the process advances to step S1011. In step S1011, the communication control unit 105 of the transmission apparatus 900 enables UIBC device information with respect to the reception apparatus 200. The processing in this step is the same as in step S310 of FIG. 3 and a description thereof will be omitted. In step S1012, the communication control unit 105 of the transmission apparatus 900 disconnects the wireless network connection from the reception apparatus 200, thereby terminating the sequence. In step S1013, the communication control unit 105 of the transmission apparatus 900 transmits the shared image to the reception apparatus 200. A method of generating and transmitting the shared image is the same as that in step S309 and a description thereof will be omitted.

As described above, according to this embodiment, prior to screen sharing, the transmission apparatus transmits a transmission confirmation image prepared in advance. The user visually perceives the screen sharing confirmation image displayed on the reception apparatus with which the screen is to be shared, and determines whether to permit screen sharing. This can reduce the possibility that a shared image is transmitted to a reception apparatus undesirable for the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-213980, filed Oct. 20, 2014, which is hereby incorporated by reference herein in its entirety.

What is claimed is:

1. A communication apparatus comprising:
    a first transmission unit configured to transmit a display image displayed on a display unit associated with the communication apparatus to another communication apparatus;
    a second transmission unit configured to, in a case where transmission of the display image by the first transmission unit is instructed, transmit data for causing the other communication apparatus to display a first confirmation image including identification information of the communication apparatus to the other communication apparatus so that the identification information of the communication apparatus is displayed on the other communication apparatus;
    a selection unit configured to select whether to transmit the display image to the other communication apparatus based on a user operation after transmitting data for causing the other communication apparatus to display the first confirmation image and before transmitting the display image; and
    a control unit configured to, in a case where the selection unit selects to transmit the display image, control the first transmission unit to transmit the display image.

2. The apparatus according to claim 1, further comprising:
    an obtainment unit configured to capture an image displayed on the first display unit to obtain image data,
    wherein the first transmission unit transmits image data capturing the display image obtained by the obtainment unit.

3. The apparatus according to claim 1, further comprising:
    a storage unit configured to store data for causing the other communication apparatus to display the first confirmation image in advance.

4. The apparatus according to claim 1, further comprising:
    a display control unit configured to, in a case where transmission of the display image by the first transmission unit is instructed, control to display a second confirmation image different from the first confirmation image on the display unit.

5. The apparatus according to claim 1, further comprising:
    a determination unit configured to determine whether to control to transmit data for causing the other communication apparatus to display the first confirmation image,
    wherein the second transmission unit transmits data for causing the other communication apparatus to display the first confirmation image in a case where the determination unit determines to control to transmit data for causing the other communication apparatus to display the first confirmation image, and the second transmission unit does not transmit data for causing the other communication apparatus to display the first confirmation image and the first transmission unit transmits the display image in a case where the determination unit determines not to transmit data for causing the other communication apparatus to display the first confirmation image.

6. The apparatus according to claim 5, wherein in a case where a security setting method used in establishing the wireless communication is a push button method, the determination unit determines to transmit data for causing the other communication apparatus to display the first confirmation image.

7. The apparatus according to claim 5, wherein in a case where it has been set, by a user operation, to transmit data for causing the other communication apparatus to display the first confirmation image, the determination unit determines to control to transmit data for causing the other communication apparatus to display the first confirmation image.

8. The apparatus according to claim 5, wherein in a case where the display image is a confidential image, said determination unit determines to control to transmit data for causing the other communication apparatus to display the first confirmation image.

9. The apparatus according to claim 5, wherein in a case where a type of the display image is a copyrighted type, said determination unit determines to determines to control to transmit data for causing the other communication apparatus to display the first confirmation image.

10. The apparatus according to claim 1, further comprising:
a setting unit configured to disable reception of information for performing a remote operation from the another communication apparatus,
wherein the second transmission unit transmits data for causing the other communication apparatus to display the first confirmation image after the setting unit disables reception of the information from the another communication apparatus.

11. The apparatus according to claim 10, wherein the setting unit disables reception of the information using RTSP (Real Time Streaming Protocol).

12. The apparatus according to claim 1, wherein the first transmission unit transmits the display image using RTSP (Real Time Streaming Protocol).

13. The apparatus according to claim 1, wherein said second transmission unit transmits data for causing the other communication apparatus to display the first confirmation image using RTSP (Real Time Streaming Protocol).

14. The apparatus according to claim 1, further comprising:
a disconnection unit configured to disconnect the wireless communication with said another communication apparatus,
wherein the control unit controls the disconnection unit to disconnect the wireless communication in a case where the selection unit selects not to transmit the display image.

15. The apparatus according to claim 1, wherein the identification information is a device name of the communication apparatus.

16. A control method for a communication apparatus, comprising:
transmitting a display image displayed on a display unit associated with the communication apparatus to another communication apparatus;
transmitting data for causing the other communication apparatus to display a first confirmation image including identification information of the communication apparatus to the other communication apparatus, so that the identification information of the communication apparatus is displayed on the other communication apparatus, in a case where transmission of the display image is instructed;
selecting whether to transmit the display image to the other communication apparatus based on a user operation after transmitting data for causing the other communication apparatus to display the first confirmation image and before transmitting the display image; and
controlling to transmit the display image in a case where the selecting selects to transmit the display image.

17. A non-transitory computer-readable storage medium storing a program which causes a computer to:
transmit a display image displayed on a display unit associated with the communication apparatus to another communication apparatus;
transmit data for causing the other communication apparatus to display a first confirmation image including identification information of the communication apparatus to the other communication apparatus, so that the identification information of the communication apparatus is displayed on the other communication apparatus, in a case where transmission of the display image is instructed;
select whether to transmit the display image to the other communication apparatus based on a user operation after transmitting data for causing the other communication apparatus to display the first confirmation image and before transmitting the display image; and
control to transmit the display image in a case where the selecting selects to transmit the display image.

* * * * *